United States Patent
Ernst et al.

(10) Patent No.: US 7,675,648 B2
(45) Date of Patent: Mar. 9, 2010

(54) METHOD AND APPARATUS FOR CONVERTING A COLOR REPRESENTATION OF AN IMAGE TO A GRAYSCALE REPRESENTATION

(75) Inventors: Larry M. Ernst, Longmont, CO (US); Yue Qiao, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 749 days.

(21) Appl. No.: 11/472,574

(22) Filed: Jun. 22, 2006

(65) Prior Publication Data

US 2007/0296985 A1    Dec. 27, 2007

(51) Int. Cl.
    G03F 3/08    (2006.01)
(52) U.S. Cl. ............ 358/1.9; 358/518; 382/162
(58) Field of Classification Search ........... 358/1.9, 358/504, 518; 385/131; 382/162
    See application file for complete search history.

(56) References Cited

U.S. PATENT DOCUMENTS

| | | | |
|---|---|---|---|
| 4,654,721 A * | 3/1987 | Goertzel et al. | 358/3.04 |
| 5,611,030 A * | 3/1997 | Stokes | 345/590 |
| 5,689,349 A * | 11/1997 | Plettinck et al. | 358/500 |
| 5,905,812 A | 5/1999 | Kim | |
| 6,414,690 B1 * | 7/2002 | Balasubramanian et al. | 345/589 |
| 6,462,748 B1 | 10/2002 | Fushiki et al. | |
| 6,681,041 B1 | 1/2004 | Stokes et al. | |
| 6,833,937 B1 * | 12/2004 | Cholewo | 358/518 |
| 6,933,950 B2 | 8/2005 | Kagawa et al. | |
| 6,954,214 B2 | 10/2005 | Wilt et al. | |
| 7,414,753 B2 * | 8/2008 | Tin | 358/1.9 |
| 2004/0257378 A1 | 12/2004 | Braun et al. | |
| 2004/0263876 A1 | 12/2004 | Chang | |
| 2005/0128484 A1 | 6/2005 | Rodrigues et al. | |
| 2005/0146736 A1 | 7/2005 | Matsuoka et al. | |
| 2005/0168487 A1 | 8/2005 | Wilt et al. | |
| 2005/0248783 A1 * | 11/2005 | Tin | 358/1.9 |
| 2008/0037890 A1 * | 2/2008 | Tanabe et al. | 382/254 |

* cited by examiner

*Primary Examiner*—Benny Q Tieu
*Assistant Examiner*—Qian Yang
(74) *Attorney, Agent, or Firm*—Antony P. Ng; Dillon & Yudell LLP

(57) ABSTRACT

A method and apparatus for converting a color representation of an image to a grayscale representation are disclosed. For a color image, a location of each color within a device-independent color space is initially determined. Then, a color difference of each color is determined by applying an appropriate perceptual-based color difference model according to its determined location within the device-independent color space. Next, the determined color difference of each color is normalized under a predetermined range. The normalized color differences are mapped to an output range of an output device.

8 Claims, 1 Drawing Sheet

METHOD AND APPARATUS FOR CONVERTING A COLOR REPRESENTATION OF AN IMAGE TO A GRAYSCALE REPRESENTATION

BACKGROUND OF THE INVENTION

1. Technical Field

The present invention relates to color mapping techniques in general, and, in particular, to a method and apparatus for converting a color representation of an image to a grayscale representation.

2. Description of Related Art

Quite often, color graphical objects, such as pie charts and bar charts, need to be converted to monochrome prints. The term "monochrome" refers to a single color of predominantly the same hue, and the most common example is grayscale. Color to grayscale conversion is an important conversion for both monochrome and color printers.

Typically, color can be described by lightness, chroma and hue. The most common method of performing color to grayscale conversion is to use a device independent color space, such as CIElab color space, as the intermediate color space to discard the chroma and hue information, and only the lightness information are converted to grayscale. Such conversion is essentially a lightness mapping. However, the well-known Kelmholtz-Kohlrausch effect indicates that at the same lightness level, the perceived lightness increases with increasing saturation. Thus, one drawback of the lightness mapping approach is that the perceived color differences in the original colors are not faithfully represented in the output. In other words, colors with large hue differences but small lightness differences will be indistinguishable in the output even though they were quite distinguishable in the input. As a result, a pie chart having red, green, yellow, etc. could show up a gray circle after the color to grayscale conversion.

Consequently, it would be desirable to provide an improved method and apparatus for converting a color representation of an image to a grayscale representation while retaining the discriminability of the original colors.

SUMMARY OF THE INVENTION

In accordance with a preferred embodiment of the present invention, for a color image, a location of each color within a device-independent color space is initially determined. Then, a color difference of each color is determined by applying an appropriate perceptual-based color difference model according to its determined location within the device-independent color space. Next, the determined color difference of each color is normalized under a predetermined range. The normalized color differences are mapped to an output range of an output device.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
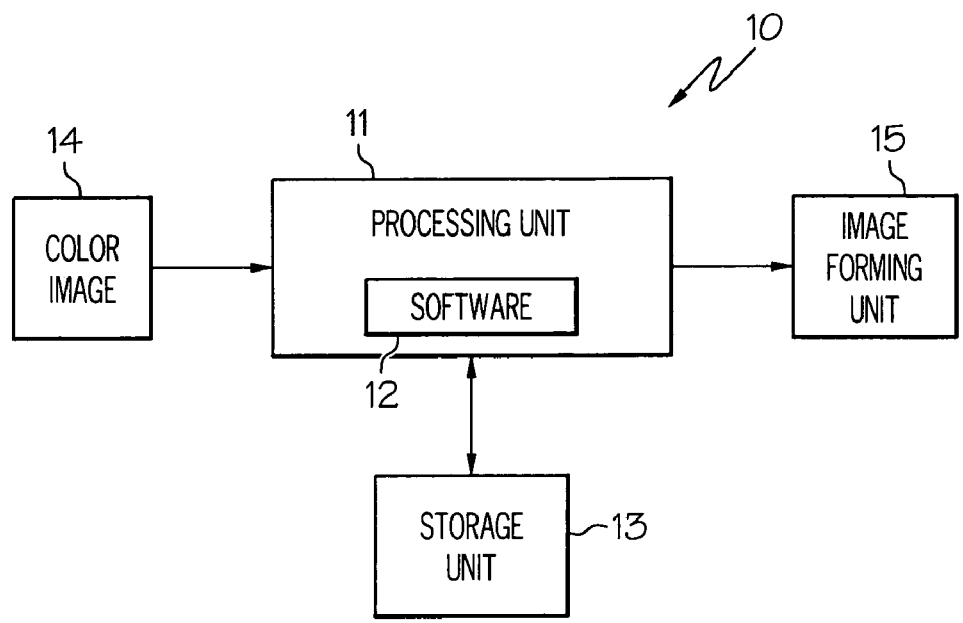
FIG. 1 is a block diagram of an apparatus capable of providing color to grayscale conversions, in accordance with a preferred embodiment of the present invention.

Referring now to the drawings and in particular to FIG. 1, there is depicted a block diagram of an apparatus for providing color to grayscale conversions, in accordance with a preferred embodiment of the present invention. As shown, an apparatus 10 includes a processing unit 11 having software 12, a storage unit 13, and an image forming unit 15. Image forming unit 15 can be an inkjet printer, a laser printer or a video display. Software 12 is operative within processing unit 11 for providing color conversions on a color image 14.

Figure 2:
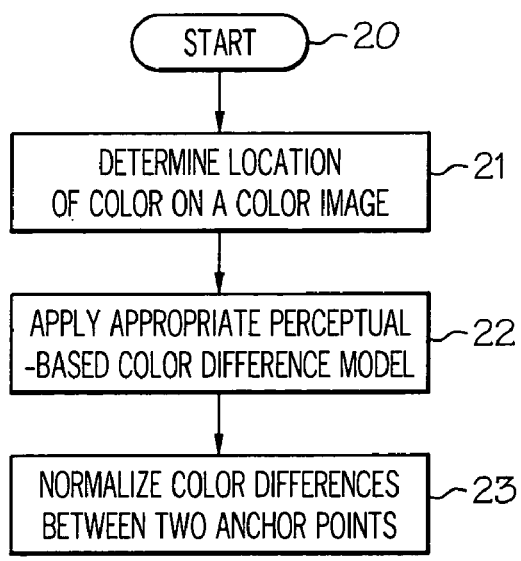
FIG. 2 is a high-level logic flow diagram of a method for converting color representations of images to grayscale representations, in accordance with a preferred embodiment of the present invention.

With reference now to FIG. 2, there is depicted a high-level logic flow diagram of a method for converting a color representation of an image to a grayscale representation, in accordance with a preferred embodiment of the present invention. Starting at block 20, the location of each color on a color image within a device-independent color space, such as CIElab, is determined, as shown in block 21. The location of a color within a device-independent color space is preferably expressed by a first Euclidean distance ($dE_1$) between the color and the white point, and a second Euclidean distance ($dE_2$) between the same color and the black point.

Then, an appropriate perceptual-based color difference model is applied to each of the two determined Euclidean distances to generate two respective color differences, as depicted in block 22. For example, CIEdE2000 can be applied to colors having $dE \leq 20$; CIELab can be applied to colors having $20 < dE \leq 30$, and a weighted color difference formula capable of compensating for the color differences in chroma, lightness and hue (or the interaction of chroma and hue) can be applied to colors having $dE > 30$.

In addition, the lightness channel of each color can also be modified with a perceptual-based color difference model that addresses the Kelmholtz-Kohlrausch effect.

Next, all the color differences are normalized between two anchor points, as shown in block 23. Preferably, the two Euclidean distance to color differences are expressed in a ratio, and then the ratio is normalized to a range of 0 to 100, with 0 being the first anchor point and 100 being the second anchor point. For monochrome prints, the first anchor point should be a media white point, and the second anchor point should be a media black point.

The same normalization procedure is also performed on the black toner within a either monochrome or color laser printer. For example, a clipping or scaling algorithm, which can be either linear or nonlinear, is applied to map the input scale of color differences to the output scale of a monochrome printer. Finally, the percentage of toners in the laser printer for printing each "color" can be calculated accordingly.

Different algorithms should be applied to pictorial image and text/graphics. For example, the color difference of a pictorial image should be minimized in order to make image transitions more smoothly, and the color difference of text and graphics should be exaggerated in order to improve contrast.

As has been described, the present invention provides an improved method and apparatus for converting color representations of images to grayscale representations. Although a laser printer is utilized to illustration the present invention, it is understood by those skilled in the art that the present invention can also be applicable to monochrome displays.

It is important to note that the method of the present invention are also capable of being distributed as a computer program product in a variety of forms, and that the present invention applies equally regardless of the particular type of signal bearing media utilized to actually carry out the distribution. Examples of signal bearing media include recordable type media such as floppy disks or compact discs.

While the invention has been particularly shown and described with reference to a preferred embodiment, it will be understood by those skilled in the art that various changes in form and detail may be made therein without departing from the spirit and scope of the invention.

What is claimed is:

1. A method for converting a color representation of an image to a grayscale representation, said method comprising:
   determining, for a color image, a location of each color within a device-independent color space;
   applying an appropriate perceptual-based color difference model to said determined location of each color within said device-independent color space to generate two color differences for each color, wherein each color location within said device-independent color space is expressed in a first and second Euclidean distances, and each color difference is based on said first Euclidean distance and said second Euclidean distance, wherein said appropriate perceptual-based color difference model is separately applied on said first Euclidean distance and said second Euclidean distance, wherein CIEdE2000 is applied to colors having an Euclidean distance less than 20, and CIELab is applied to colors having an Euclidean distance greater than 20 but less than 30;
   normalizing said two color differences for each color under a predetermined range;
   mapping said normalized color differences to an output range of an output device; and
   outputting a grayscale representation of said color image on said output device by using said normalized color differences.

2. The method of claim 1, wherein said first Euclidean distance is a distance between a color and a white point, and said second Euclidean distance is a distance between said color and a black point.

3. The method of claim 1, wherein said output device is a monochrome output device.

4. A computer usable medium having a computer program product for converting a color representation of an image to a grayscale representation, said computer usable medium comprising:
   program code for receiving a color image;
   program code for determining, for said color image, a location of each color within a device-independent color space;
   program code for applying an appropriate perceptual-based color difference model to said determined location of each color within said device-independent color space to generate two color differences for each color, wherein each color location within said device-independent color space is expressed in a first and second Euclidean distances, and each color difference is based on said first Euclidean distance and said second Euclidean distance, wherein said appropriate perceptual-based color difference model is separately applied on said first Euclidean distance and said second Euclidean distance, wherein CIEdE2000 is applied to colors having an Euclidean distance less than 20, and CIELab is applied to colors having an Euclidean distance greater than 20 but less than 30;
   program code for normalizing said two color differences for each color under a predetermined range;
   program code for mapping said normalized color differences to an output range of an output device; and
   program code for outputting a grayscale representation of said color image on said output device by using said normalized color differences.

5. The computer usable medium of claim 4, wherein said first Euclidean distance is a distance between a color and a white point, and said second Euclidean distance is a distance between said color and a black point.

6. An apparatus for converting a color representation of an image to a grayscale representation, said apparatus comprising:
   means for determining, for a color image, a location of each color within a device-independent color space;
   means for applying an appropriate perceptual-based color difference model to said determined location of each color within said device-independent color space to generate two color differences for each color, wherein each color location within said device-independent color space is expressed in a first and second Euclidean distances, and each color difference is based on said first Euclidean distance and said second Euclidean distance, wherein said appropriate perceptual-based color difference model is separately applied on said first Euclidean distance and said second Euclidean distance, wherein CIEdE2000 is applied to colors having an Euclidean distance less than 20, and CIELab is applied to colors having an Euclidean distance greater than 20 but less than 30;
   means for normalizing said two color differences for each color under a predetermined range;
   means for mapping said normalized color differences to an output range of an output device; and
   means for outputting a grayscale representation of said color image on said output device by using said normalized color differences.

7. The apparatus of claim 6, wherein said first Euclidean distance is a distance between a color and a white point, and said second Euclidean distance is a distance between said color and a black point.

8. The apparatus of claim 6, said output device is a monochrome output device.

* * * * *